W. A. JAMES.
MILLING CUTTER.
APPLICATION FILED APR. 8, 1918.

1,351,386.

Patented Aug. 31, 1920.

WITNESSES
H. T. Walker
C. Bradway

INVENTOR
W. A. James
BY
ATTORNEYS

UNITED STATES PATENT OFFICE.

WILLIAM ALFRED JAMES, OF WOONSOCKET, RHODE ISLAND.

MILLING-CUTTER.

1,351,386.  Specification of Letters Patent. Patented Aug. 31, 1920.

Application filed April 8, 1918. Serial No. 227,305.

*To all whom it may concern:*

Be it known that I, WILLIAM A. JAMES, a citizen of the United States, and a resident of Woonsocket, in the county of Sanborn and State of Rhode Island, have invented a new and Improved Milling-Cutter, of which the following is a full, clear, and exact description.

This invention relates to milling cutters of that type disclosed in United States Letters Patent 1245726, granted to me on the sixth day of November, 1917, wherein the cutters or tool elements are set in coaxially arranged disks, which by means of cam surfaces are given a relative rotation in opposite directions by the drawing of the disks together, so that the tool elements are tightly clamped in the disks without any extra fastening means.

The invention has for its general objects to improve and simplify the construction of milling cutters of this character so as to be easy and inexpensive to manufacture, reliable and efficient in use, and so designed that the cam surfaces in the former construction are dispensed with for producing the relative rotation of the disks to clamp the cutters therein.

A more specific object of the invention is the provision of a milling cutter in which certain of the tool elements are set at an angle to the axis of rotation, while others are parallel with such axis, so that when the disks are moved axially one with respect to the other, all the disks are effectively clamped or unclamped.

With such objects in view, and others which will appear as the description proceeds, the invention comprises various novel features of construction and arrangement of parts which will be set forth with particularity in the following description and claims appended hereto.

In the accompanying drawing, which illustrates certain embodiments of the invention and wherein similar characters of reference indicate corresponding parts in all the views.

Figure 1:
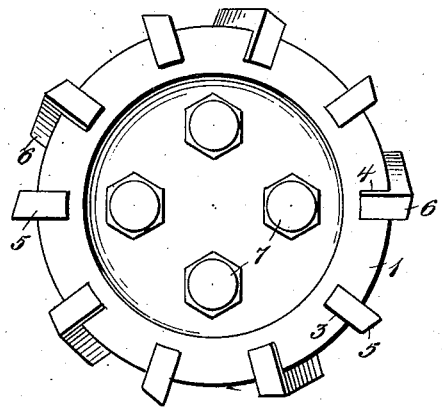
Figure 1 is an end view of the milling tool.

Referring to the drawing, 1 and 2 designate the disks that constitute the body of the milling tool, and in the periphery of the disks 1 are slots or recesses 3 and 4 alternately arranged, the slots 3 being parallel with the axis of the milling tool and the slots 4 at an angle to such axis. The disk or section 2 has slots $3^a$ and $4^a$ alining with the slots 3 and 4, respectively, of the section 1. In the alining slots 3 and $3^a$ are tool elements, teeth or cutters 5, and in the alining slots 4 and $4^a$ are tool elements, teeth or cutters 6. The two sections or disks are moved axially toward each other by means of clamping bolts 7 which are spaced around the central axis so as to cause a better clamping action on the teeth 5 and 6. The inclined or angularly set teeth 6 cause a relative rotation of the two disks or sections 1 and 2 as they are drawn together, and consequently all the teeth are tightly bound or clamped in their recesses, so that no extra fastenings are required to hold the teeth in place. By unclamping the bolts 7 the disks can be moved apart to release the teeth.

Figure 2:
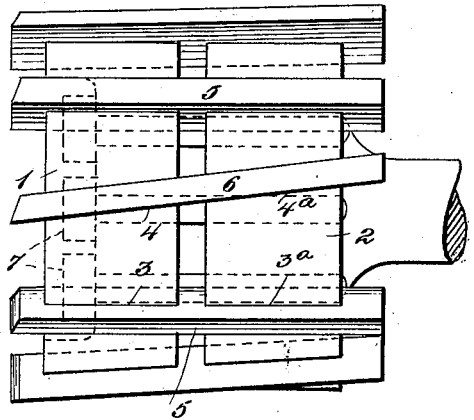
Fig. 2 is a side view thereof.
Figure 3:
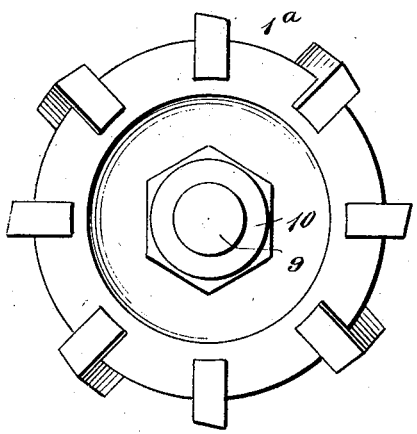
Fig. 3 is an end view of a modified form of milling tool.
Figure 4:
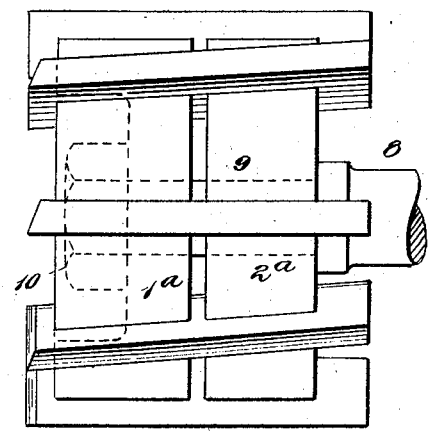
Fig. 4 is a side view thereof.

In the construction shown in Figs. 3 and 4, the tool spindle 8 has a reduced end 9 with a nut 10, and on this reduced portion are mounted the disks $1^a$ and $2^a$. The construction shown in Figs. 3 and 4 is satisfactory for small cutters, whereas the clamping arrangement shown in Figs. 1 and 2 is preferable for large cutters, where a single clamping bolt would not produce the desired clamping action between the teeth and their holding disks 1 and 2.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A milling tool comprising a pair of relatively axially and rotatably movable members, tool elements mounted on the members at different angles to the axis thereof, and means for moving the members axially one with respect to the other, whereby the tool elements cause relative rotation of the members to clamp the elements therein.

2. A milling tool comprising a pair of relatively axially and rotatably movable members, means for moving the members axially one with respect to the other, tool elements carried by the members and disposed parallel with the axis thereof, and tool elements mounted on the members at an angle to the axis thereof, whereby said means coacts with the tool elements to produce relative rotation of the members and clamp the tool elements therein.

3. A milling tool comprising a pair of disks mounted on a common axis, means for axially moving the disks one with respect to the other, cutter elements carried by the disks and arranged parallel with the axes thereof and clamped by relative rotation of the axes, and additional cutter elements mounted on the disks and disposed at an angle to said common axis, whereby the axial movement of the disks causes the cutter elements to produce, by cam action, relative rotation of the disks to clamp the elements therein.

4. A milling tool comprising a pair of disk-like sections, recesses in each section arranged at different angles to the axis of the tool, the recesses of one section being in alinement with the recesses of the other section, tool elements set in the alining recesses, and clamping means arranged in the sections at points between the center and periphery thereof for producing relative axial movement of the sections, whereby the tool elements in the recesses cause relative rotation of the sections to clamp the tool elements therein.

WILLIAM ALFRED JAMES.